(12) United States Patent
Dostert et al.

(10) Patent No.: US 7,886,294 B2
(45) Date of Patent: Feb. 8, 2011

(54) VIRTUAL MACHINE MONITORING

(75) Inventors: Jan Dostert, Nussloch (DE); Frank Kilian, Mannheim (DE)

(73) Assignee: SAP AG, Walldorf (DE)

( * ) Notice: Subject to any disclaimer, the term of this patent is extended or adjusted under 35 U.S.C. 154(b) by 1549 days.

(21) Appl. No.: 11/024,390

(22) Filed: Dec. 28, 2004

(65) Prior Publication Data

US 2006/0143359 A1  Jun. 29, 2006

(51) Int. Cl.
G06F 9/455 (2006.01)
G06F 12/00 (2006.01)
(52) U.S. Cl. .......................................... 718/1; 707/814
(58) Field of Classification Search ..................... 718/1; 707/206
See application file for complete search history.

(56) References Cited

U.S. PATENT DOCUMENTS

| | | | |
|---|---|---|---|
| 5,682,328 A | 10/1997 | Roeber et al. | |
| 5,905,868 A | 5/1999 | Baghai et al. | |
| 5,909,540 A | 6/1999 | Carter et al. | |
| 5,951,643 A | 9/1999 | Shelton et al. | |
| 6,094,528 A * | 7/2000 | Jordan | 717/115 |
| 6,467,052 B1 | 10/2002 | Kaler et al. | |
| 6,519,594 B1 | 2/2003 | Li | |
| 6,643,802 B1 | 11/2003 | Frost et al. | |
| 6,654,948 B1 | 11/2003 | Konuru et al. | |
| 6,738,977 B1 | 5/2004 | Berry et al. | |
| 6,795,856 B1 | 9/2004 | Bunch | |
| 6,795,966 B1 * | 9/2004 | Lim et al. | 718/1 |
| 6,854,114 B1 | 2/2005 | Sexton et al. | |
| 6,904,589 B1 * | 6/2005 | Kolodner et al. | 717/116 |
| 6,912,553 B1 * | 6/2005 | Kolodner et al. | 707/206 |
| 7,124,170 B1 | 10/2006 | Sibert | |
| 7,127,713 B2 | 10/2006 | Davis et al. | |
| 7,155,512 B2 | 12/2006 | Lean et al. | |
| 7,194,761 B1 | 3/2007 | Champagne | |
| 7,216,160 B2 | 5/2007 | Chintalapati et al. | |
| 7,237,140 B2 | 6/2007 | Nakamura et al. | |
| 7,296,267 B2 | 11/2007 | Cota-Robles et al. | |
| 7,302,423 B2 | 11/2007 | De Bellis | |
| 7,302,609 B2 | 11/2007 | Matena et al. | |

(Continued)

FOREIGN PATENT DOCUMENTS

GB  2365553  2/2002

(Continued)

OTHER PUBLICATIONS

Non-Final Office Action for U.S. Appl. No. 11/024,393 Mailed Nov. 26, 2008, 29 pages.

(Continued)

*Primary Examiner*—Emerson C Puente
*Assistant Examiner*—Camquy Truong
(74) *Attorney, Agent, or Firm*—Blakely Sokoloff Tayor & Zafman

(57) ABSTRACT

A system and method for monitoring internal operation of a virtual machine ("VM"). The VM is operated to interpret and execute a program. During operation of the VM, status information regarding internal operation of the VM is stored to an internal memory buffer. The status information is subsequently extracted from the internal memory buffer during operation of the VM to monitor internal operation of the VM from a vantage point external to the VM.

20 Claims, 5 Drawing Sheets

U.S. PATENT DOCUMENTS

| | | | |
|---|---|---|---|
| 7,386,848 B2 | 6/2008 | Cavage et al. | |
| 7,418,560 B2 | 8/2008 | Wintergerst | |
| 7,565,385 B2* | 7/2009 | Chauvel et al. | 1/1 |
| 2002/0073063 A1* | 6/2002 | Faraj | 707/1 |
| 2002/0078060 A1 | 6/2002 | Garst et al. | |
| 2002/0083166 A1* | 6/2002 | Dugan et al. | 709/223 |
| 2003/0009533 A1 | 1/2003 | Shuster | |
| 2003/0014521 A1 | 1/2003 | Elson et al. | |
| 2003/0028671 A1 | 2/2003 | Mehta et al. | |
| 2003/0084248 A1 | 5/2003 | Gaither et al. | |
| 2003/0088604 A1 | 5/2003 | Kuck et al. | |
| 2003/0097360 A1 | 5/2003 | McGuire et al. | |
| 2003/0131286 A1 | 7/2003 | Kaler et al. | |
| 2003/0177382 A1 | 9/2003 | Ofek et al. | |
| 2003/0195938 A1 | 10/2003 | Howard et al. | |
| 2003/0212654 A1 | 11/2003 | Harper et al. | |
| 2004/0024971 A1 | 2/2004 | Bogin et al. | |
| 2004/0078722 A1 | 4/2004 | Pfeiffer et al. | |
| 2004/0080535 A1 | 4/2004 | Lueckhoff et al. | |
| 2004/0181537 A1 | 9/2004 | Chawla et al. | |
| 2005/0005200 A1 | 1/2005 | Matena et al. | |
| 2005/0044301 A1 | 2/2005 | Vasilevsky et al. | |
| 2005/0060704 A1 | 3/2005 | Bulson et al. | |
| 2005/0262181 A1 | 11/2005 | Schmidt et al. | |
| 2005/0278346 A1 | 12/2005 | Shang et al. | |
| 2006/0053112 A1 | 3/2006 | Chitkara et al. | |
| 2006/0206856 A1 | 9/2006 | Breeden et al. | |
| 2007/0266305 A1 | 11/2007 | Cong et al. | |

FOREIGN PATENT DOCUMENTS

| | | |
|---|---|---|
| WO | WO-00/23898 | 4/2000 |

OTHER PUBLICATIONS

Non-Final Office Action for U.S. Appl. No. 11/013,278, Mailed Dec. 23, 2008, 28 pages.

Non-Final Office Action for U.S. Appl. No. 11/012,803, Mailed Dec. 23, 2008, 22 pages.

Notice of Allowance for U.S. Appl. No. 11/024,392, Mailed Mar. 12, 2009. 11 pages.

Final Office Action for U.S. Appl. No. 11/012,803, Mailed Jul. 22, 2008, 22 pages.

Final Office Action for U.S. Appl. No. 11/013,277, Mailed Aug. 7, 2008, 22 pages.

Non-Final Office Action for U.S. Appl. No. 11/013,277, Mailed Jan. 6, 2009, 22 pages.

Notice of Allowance for U.S. Appl. No. 11/024,393, Mailed Apr. 1, 2009, 8 pages.

Non-Final Office Action for U.S. Appl. No. 11/024,394 dated Apr. 27, 2009; 33 pages.

Cheung, KC , et al., "Lightweight Trace and Interpreter for Interprocess Timing Problems", *IP.COM Journal*, IP.COM Inc., West Henrietta, NY US, XP013096988, ISSN: 1533-0001, (Jun. 1, 1992), Whole Document.

EPO, "6570P210EP EP Search Report Mailed Jun. 4, 2008 for EP Patent Application 05027365.5-1225", (Jun. 4, 2008), Whole Document.

Viswanathan, D. , et al., "Java Virtual Machine Profiler Interface", *IBM Systems Journal IBM USA*, vol. 39, No. 1, XP002481425, ISSN: 0018-8670, (2000), 82-95.

Wolczko, Mario , "Using a Tracing Java Virtual Machine to Gather Data on the Behavior of Java Programs", *Internet Citation*, XP002375976, research.sun.com/people/mario/tracing-jvm/tracing.pdf, (Retrieved on Apr. 6, 2006), Whole Document, 1999.

""FOA Mailed Aug. 13, 2008 for U. S. Appl. 11/013,278 Whole Document.

Galchev, Galin , "Plug-In Based Caching Architecture Capable of Implementing Multiple Cache Regions per Application", U.S. Appl. No. 11/024,554, filed Dec. 28, 2004—Non-Final Office Action mailed May 28, 2008, 7 pgs.

Galchev, Galin , et al., "Plug-In Based Caching Architecture Capable of Implementing Multiple Cache Regions per Application", U.S. Appl. No. 11/024.554, filed Dec. 28, 2004.

Petev, Petio , et al., "Common Cache Management in a Plurality of Virtual Machines", U.S. Appl. No. 11/025,482, filed Dec. 28, 2004.

Petev, Petio , et al., "First In First Out Eviction Implementation", U.S. Appl. No. 11/024,546, filed Dec. 28, 2004.

Petev, Petio G., et al., "Programming Models for Storage Plug-Ins", U.S. Appl. No. 11/024,651, filed Dec. 28, 2004.

Petev, Petio , et al., "Size Based Eviction Implementation", U.S. Appl. No. 11/024,591, filed Dec. 28, 2004.

USPTO, "OA Mailed Jun. 27, 2008 for U.S. Appl. No. 11/024,391", (Jun. 27, 2008), Whole Document.

USPTO, "FOA Mailed Aug. 6, 2008 for U.S. Appl. No. 11/024,393", Whole Document.

USPTO, "FOA Mailed Sep. 17, 2008 for U.S. Appl. No. 11/024,392", Whole Document.

Wintergerst, Michael , "Storage Plugin Based on Shared Closures",, U.S. Appl. No. 11/024,613, filed Dec. 28, 2004.

" FOA Mailed Aug. 17, 2007 for U.S. Appl. No. 11/013,277",, Whole Document.

"OA Mailed Jan. 7, 2008 for U.S. Appl. No. 11/013,277",, Whole Document.

"OA Mailed Mar. 12, 2007 for U.S. Appl. No. 11/013,277",, Whole Document.

"Foa Mailed Aug. 17, 2007 for U.S. Appl. No. 11/013,278",, Whole Document.

" OA Mailed Feb. 5, 2008 for U.S. Appl. No. 11/013,278",, Whole Document.

"OA Mailed Mar. 16, 2007 for U.S. Appl. No. 11/013,278",, Whole Document.

" FOA Mailed Aug. 28, 2007 for U.S. Appl. 11/012803", (Aug. 28, 2007), Whole Document.

" OA Mailed Jan. 24, 2008 for U.S. Appl. 11/012,803", (Jan. 24, 2008), Whole Document.

" OA Mailed Mar. 16, 2007 for U.S. Appl. No. 11/012,803",, Whole Document.

" OA Mailed Jan. 24, 2008 for U.S. Appl. No. 11/024,393",, Whole Document.

" FOA Mailed Dec. 11, 2007 for U.S. Appl. No. 11/118,259",, Whole Document.

" OA Mailed Apr. 4, 2008 for U.S. Appl. No. 11/118,259",, Whole Document.

" OA Mailed Jun. 11, 2007 for U.S. Appl. No. 11/118,259",, Whole Document.

"EP 05027361, European Search Report",, Whole Document.

USPTO, " OA Mailed Apr. 4, 2008 for U.S. Appl. No. 11/024,392", Whole Document.

Notice of Allowance for U.S. Appl. No. 11/012,803, Mailed Jun. 10, 2009, 27 pages.

Notice of Allowance for U.S. Appl. No. 11/013,278, Mailed Jun. 11, 2009, 25 pages.

Notice of Allowance for U.S. Appl. No. 11/013,277 dated Jun. 25, 2009; 24 pages.

Notice of Allowance for U.S. Appl. No. 11/024,394 Mailed Sep. 3, 2009, 5 Pages.

Notice of Allowability for U.S. Appl. No. 11/012,803, Mailed Sep. 3, 2009, 12 Pages.

Notice of Allowance for U.S. Appl. No. 11/024,394 Mailed Nov. 17, 2009, 5 Pages.

"European Application Serial No. 05027367.1, Office Action mailed Aug. 11, 2009; 6 pages", 6 pgs.

USPTO, "Office Action for U.S. Appl. No. 11/013,276, filed Dec. 14, 2004.", (Sep. 17, 2009), Whole Document.

"XI Exchange Infrastructure; SAP XI Tuning; SAP 2002; pp. 1-16.", (2002), 1-16.

Alfons Kemper, Donald Kossmann,, Bernhard Zeller , "Performance Tuning for SAP R/3; IEEE 1999; pp. 32-39.", (1999), 32-39.

Shaw, "A Complete Guide to OS/2 Interprocess Communications and Devise Monitors; Microsoft System journal, vol. 4, No. 5, Sep. 89,", 30-35.

Web Application Server, "Web Application Technology and Web Dynpro; SAP White pages; SAP 2001;", (2001), 1-29.

EPO, "Office Action for European Patent Application No. 05027365.5", (Apr. 22, 2010), Whole Document.

Laing, S.., "The Java Native Interface—Programmer's Guide and Specification,", Addison—Wesley, (Jun. 1999), 9 pages.

Sun Microsystems, "Java Platform Debugger Architecture", XP002240826, (Dec. 14, 1999), 24 pages.

* cited by examiner

VIRTUAL MACHINE MONITORING

TECHNICAL FIELD

This disclosure relates generally to virtual machines, and in particular but not exclusively, relates to monitoring internal operation of virtual machines.

BACKGROUND INFORMATION

Enterprise software has transformed the way diverse enterprises, large and small a like, transact and manage day-to-day operations. Businesses use enterprise software (e.g., web based application servers) to control production planning, purchasing and logistics, warehouse and inventory management, production, vendor management, customer service, finance, personnel management, and other basic business activities. As the enterprise software industry continues to mature, the various application and hardware resources enlisted to facilitate this diverse set of tasks are being amalgamated into robust, highly integrated solutions (e.g., SAP NetWeaver, SAP xAPPs, mySAP Business Suite, etc.).

To integrate diverse hardware and software resources, developers of enterprise software have leveraged cross platform engines capable of minimizing or even severing platform dependencies from the enterprise solution. The Java 2 Platform, Enterprise Edition™ ("J2EE") (e.g., J2EE Specification, Version 1.4) is a Java based solution supported by the Java Virtual Machine ("JVM") engine. J2EE simplifies application development and decreases the need for programming and programmer training by creating standardized and reusable modular components. The popularity of Java based solutions is evident as the Information Technology ("IT") world has gravitated to the Java language.

As enterprise software is woven into the fabric of modern business, failure of an enterprise solution may no longer be a mere nuisance, but has the potential to wreak catastrophic havoc on a business. As such, robust, reliable software is evermore critical. The enterprise software industry is marching toward the ultimate goal of self-healing software capable of sustainable, uninterrupted operation, without human intervention. In pursuit of this goal, IT technicians can benefit from convenient tools capable of monitoring the health of their enterprise software. With appropriate monitoring tools, IT technicians can take appropriate action in a timely manner to ensure a healthful state of their software or to spot delinquent applications and prevent repeat offenders. Currently, JVMs do not provide adequate mechanisms to monitor their internal operation on a real-time basis.

SUMMARY OF INVENTION

A system and method of monitoring internal operation of a virtual machine ("VM") is described. The VM is operated to interpret and execute a program. During operation of the VM, status information regarding internal operation of the VM is stored to an internal memory buffer. The status information is subsequently extracted from the internal memory buffer during operation of the VM to monitor internal operation of the VM from an external vantage point of the VM. In one embodiment, the VM is a Java VM.

In one embodiment, the status information is accumulated by executing monitoring code embedded within the program. Execution of the monitoring code can be interleaved with execution of program code of the program.

During execution of the program, objects are created and stored to a heap. When the objects are no longer referenced by the program, an automatic garbage collector erases the unreferenced objects. In one embodiment, the status information includes garbage collecting activity information.

In one embodiment, a native VM monitor is invoked to retrieve the status information from within the internal memory buffer. The retrieved status information may then be communicated to a monitoring console for display on the monitoring console.

In one embodiment, a VM monitoring program is interpreted and executed on the VM. The VM monitoring program is dedicated to gathering at least a portion of the status information from components of the VM and store the portion of the status information to the internal memory buffer.

In one embodiment, the internal memory buffer is insulated from failure of the VM. If the VM should fail, the internal memory buffer may be accessed after the failure to conduct a postmortem investigation of why the VM failed.

Embodiments of the invention may include all or some of the above described features. The above features can be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
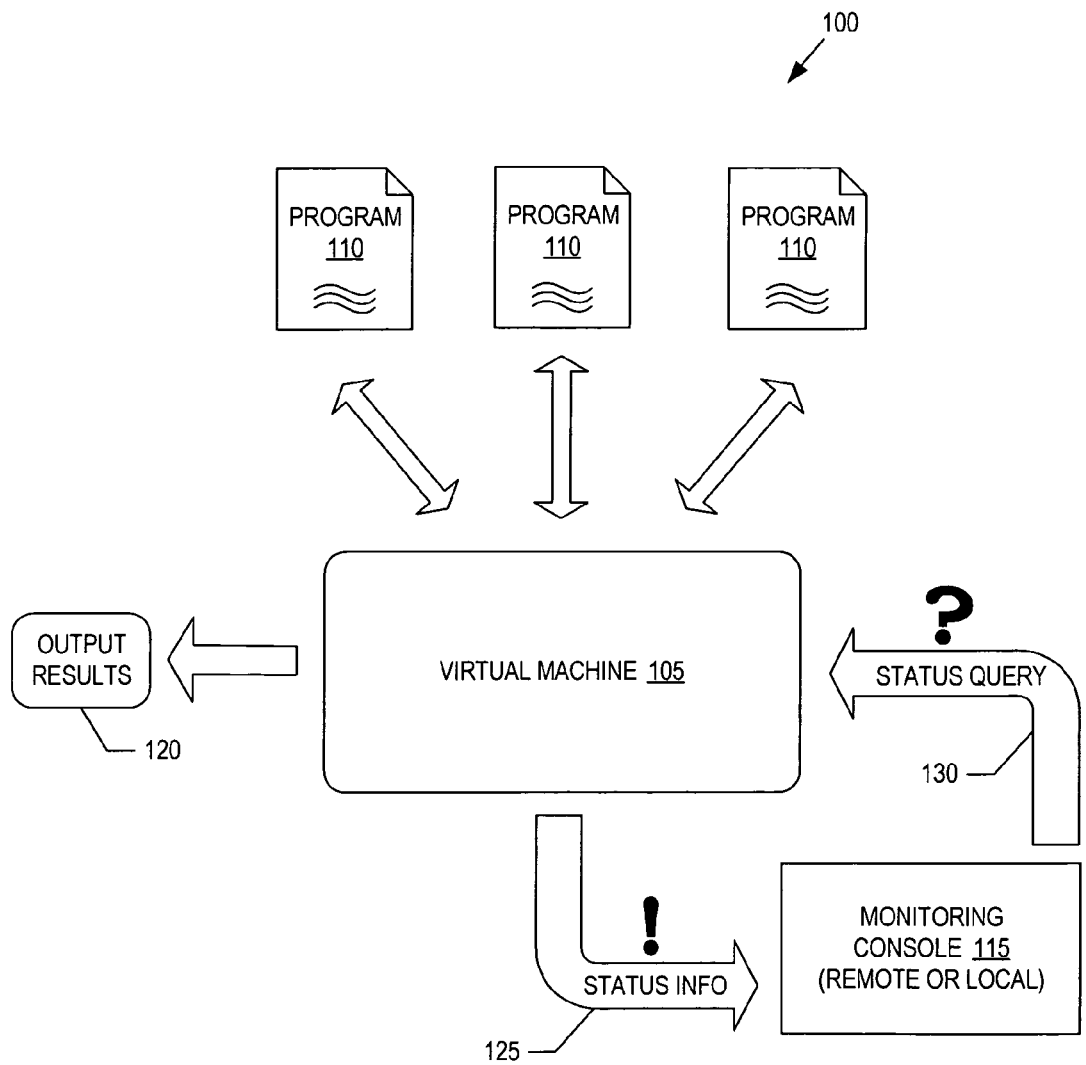
FIG. 1 is a block diagram of a system for monitoring the internal operation of a virtual machine ("VM"), in accordance with an embodiment of the invention.

Embodiments of a system and method for monitoring internal operation of a virtual machine ("VM") are described herein. FIG. 1 is a block diagram of a system 100 for monitoring the internal operation of a virtual machine ("VM") 105, in accordance with an embodiment of the invention. The illustrated embodiment of system 100 includes VM 105, programs 110, and a monitoring console 115. Although three programs 110 are illustrated as operating on VM 105, more or less programs 110 may concurrently operate in a time multiplexing manner.

VM 105 interprets and executes one or more programs 110 to generate output results 120. VM 105 interprets programs 110 by converting them from an intermediate interpreted language (e.g., bytecode) into a native machine language, which is then executed. In one embodiment, VM 105 is a Java VM ("JVM") while programs 110 represent Java programs compiled into Java bytecode. Although embodiments of the invention are described in connection with the object oriented Java programming language, the techniques described herein are equally applicable to other interpreted languages and VMs used to interpret and execute these languages.

During operation of VM 105, VM 105 can provide real-time status information 125 to monitoring console 115 for display thereon. Status information 125 may provide detailed operational information of the internal workings of VM 105 during interpreting and executing programs 110. An Information Technology ("IT") technician can simply scan status information 125 displayed on monitoring console 115 to determine whether VM 105 is operating in a healthful state, whether a failure is imminent, or otherwise. Furthermore, status information 125 may be accessed after VM 105 has failed/crashed to conduct a postmortem investigation as to the cause of the failure.

Status information 125 may be "pulled" to monitoring console 115 in response to status queries 130 issued by monitoring console 115 or status information 125 may be "pushed" to monitoring console 115. Pushing status information 125 to monitoring console 115 may be event triggered or periodically triggered. Monitoring console 115 may be located locally on the same hardware machine executing VM 105, or advantageously, executed on a remote machine communicatively couple thereto. Status information 125 may include a variety of data including, but not limited to, garbage collecting activity, heap status, execution activity, thread activity, program activity, and the like.

Figure 2:
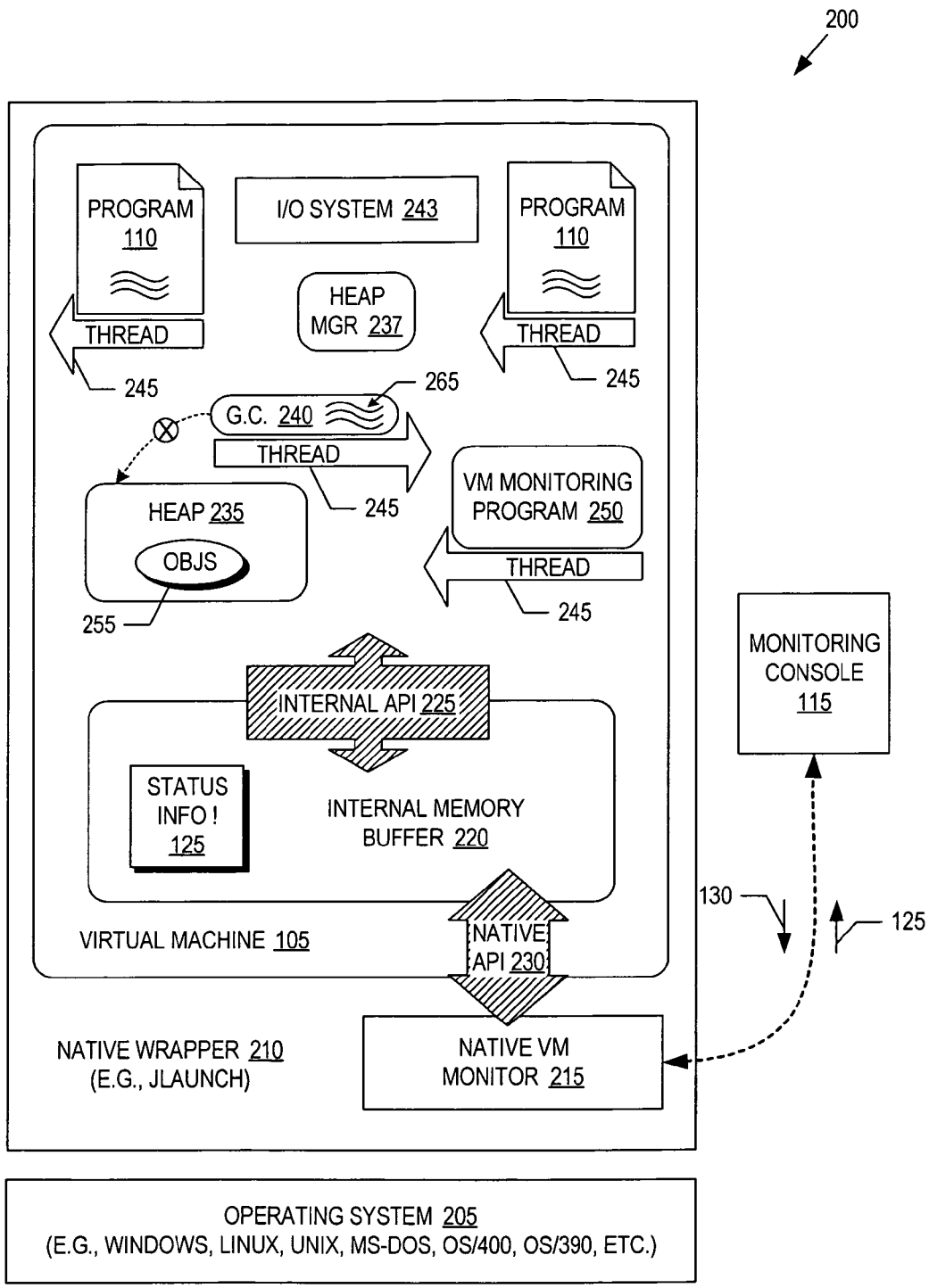
FIG. 2 is a block diagram illustrating a software system including a VM capable of providing internal status information to external entities for monitoring the VM, in accordance with an embodiment of the invention.

FIG. 2 is a block diagram illustrating a software system 200 including a VM 105 capable of providing status information 125 to external entities for monitoring internal operation of VM 105, in accordance with an embodiment of the invention. The illustrated embodiment of software system 200 includes an operating system 205 (e.g., Windows, Linux, Unix, MS-DOS, OS/400, OS/390, etc.), a native wrapper 210, VM 105, and a native VM monitor 215.

Native wrapper 210 provides the runtime environment for VM 105. In an embodiment where VM 105 is a JVM complaint with the Java 2 Platform, Enterprise Edition™ ("J2EE") (e.g., J2EE Specification, Version 1.4), native wrapper 210 is often referred to as "JLaunch." Native wrapper 210 is native machine code (e.g., compiled C++) executed and managed by OS 205. Once launched, native wrapper 210 establishes VM 105 within itself.

During operation, the illustrated embodiment of VM 105 includes an internal memory buffer 220, an internal application programming interface ("API") 225, a native API 230, a heap 235, a heap manager 237, a garbage collector 240, an input/output ("I/O") system 243, and multiple threads 245 to maintain information associated with a variety of tasks (e.g., programs 110, garbage collector 240, etc.) currently being executed by VM 105. Threads 245 have not been illustrated for all executable entities in FIG. 2, so not to crowd FIG. 2 and obscure the invention. Internal memory buffer 220 is used by VM 105 to store status information 125 collected from various internal components of VM 105 during operation. Internal API 225 provides the various internal components of VM 105 access to internal memory buffer 220. In an embodiment where VM 105 is a JVM, internal API 225 is referred to as a "Java API." Native API 230 provides entities external to VM 105 access to internal memory buffer 220, and therefore status information 125, to monitor the internal operation of VM 105 from an external vantage point. Native API 230 enables native machine code entities, such as native VM monitor 215, to access internal memory buffer 220 without being interpreted and executed on VM 105 itself. Although FIG. 2 illustrates native VM monitor 215 as internal to native wrapper 210, in some embodiments native VM monitor 215 may be external to native wrapper 210.

Heap 235 is established by VM 105 as a pre-reserved memory pool for future use by programs 110 and a VM monitoring program 250 (discussed in detail below) as they are loaded. Heap 235 is managed by heap manager 237 of VM 105 for allocating and deallocating memory as is required by programs 110 and for storing objects 255, created by programs 110 (or VM monitoring program 250).

In an embodiment where programs 110 are object-oriented programs (e.g., Java programs), they generally include objects and classes. When programs 110 are loaded and executed by VM 105, objects 255 are created and then stored to heap 235. Classes include methods that perform tasks and return information when they complete those tasks. Objects are essentially reusable software components that model pieces of software programs in terms of properties and behaviors. Classes are used to instantiate an object with these properties and behaviors. In other words, each of objects 255 inherit their properties and behaviors from a class used to instantiate (e.g., create) the particular object 255.

As programs 110 consume heap 235 by filling it with objects 255, memory within heap 235 available to accept new objects may become scarce. Accordingly, garbage collector 240 implements a disciplined procedure for returning consumed memory back to heap 235. In one embodiment, garbage collector 240 is automatically executed by VM 105 to reclaim dynamically allocated memory without explicit instructions to do so by the programmer of programs 110. When there are no more references to one of objects 255 within heap 235, the particular object 255 is marked for garbage collection. The memory consumed by the marked object 255 is then reclaimed when garbage collector 240 executes. Performing regular garbage collection when available memory within heap 235 becomes scarce helps avoid resource leaks.

However, when available memory within heap 235 becomes scarce, performance of VM 105 suffers due to the garbage collecting activity. For example, if heap 235 exceeds 80% capacity, garbage collecting activities of garbage collector 240 may result in the productive computing output (e.g., output results 120, see FIG. 1) of VM 105 grinding to a near halt. Although garbage collector 240 is relative good at deleting unreferenced objects 255 to reclaim consumed memory, not all idle objects 255 are reclaimed for a variety of reasons. As such, the older VM 105 happens to be, the more likely that VM 105 is to suffer from chronic garbage collecting activity.

In one embodiment, various entities of VM 105 are "instrumented" with monitoring code to accumulate/generate at least a portion of status information 125 and copy the portion of status information 125 into internal memory buffer 220. Execution of the monitoring code may be interleaved with execution of the regular program code of the entities. The portion of status information 125 which is accumulated/generated by the monitoring code may include processing start and stop times of each entity, processing runtime of each thread 245 executing the entity, a number of objects 255 created by the particular entity, an amount of memory consumed by the entity, and the like. Each entity can be instrumented to accumulate and/or generate a variety of status information 125 relating the operation and execution of the particular entity. These entities may include garbage collector 240, heap manager 237, I/O system 243, and the like. The monitoring code instrumented into each of these entities has the purpose to collect at least a portion of the vast amount of status information available within VM 105 and report it into internal memory buffer 220.

In one embodiment, garbage collector 240 is instrumented with monitoring code 265 to accumulate/generate at least a portion of status information 125 and copy the portion of status information 125 into internal memory buffer 220. Execution of monitoring code 265 may be interleaved with execution of the regular garbage collecting activities of garbage collector 240. In one embodiment, monitoring code 265 is executed in response to a garbage collecting event. The portion of status information 125 which is accumulated/generated by monitoring code 265 includes a variety of garbage collecting related information. This garbage collecting related information may include: time stamps and runtimes of garbage collecting events executed by garbage collector 240, a count of garbage collecting events, a count of the number of objects 255 collected from heap 235 during each garbage collecting event, an amount of memory reclaimed within heap 235 during each garbage collecting event, an amount of memory available within heap 235, hits rates of objects 255 within heap 235 by requesters (e.g., programs 110), heap 235 utilization, and the like. Furthermore, monitoring code 265 may maintain a history of recent garbage collecting events within internal memory buffer 220 and index each garbage collecting event to some or all of the above garbage collecting related information.

In one embodiment, VM monitoring program 250 may be interpreted and executed on VM 105 for the primary purpose of gathering status information 125 and copying status information 125 into internal memory buffer 220. VM monitoring program 250 may be provided solely to perform monitoring duties. VM monitoring program 250 may collect/generate any or all of the above status information 125 described above, as well as other monitoring information. Writing an independent program dedicated for monitoring tasks, enables monitoring programs to be written well after programs 110 and garbage collector 240 have been designed without need to update programs 110 and garbage collector 240. VM monitoring program 250 enables developers to generate dedicate monitoring programs to investigate problems or "bugs" within VM 105 or programs 110, which do not become apparent until after VM 105 and/or programs 110 have been written and released to the public. In fact, many software problems do not become apparent until a software build has been released to a large user base. As such, VM monitoring program 250 may be designed to aid with alpha testing of programs 110 and/or VM 105 or even included in a beta release of programs 110 and/or VM 105. VM monitoring program 250 provides an effective mechanism for implementing later developed monitoring code for execution on VM 105.

The monitoring code, including monitoring code 265, and VM monitor program 250 access internal memory buffer 220 to copy status information 125 thereto via internal API 225. In one embodiment, internal API 225 abstracts access to internal memory buffer 220 through use of function calls. Each component of VM 105 that wishes to copy status information 125 into internal memory buffer 220 makes a "call" to one or more functions published internally to VM 105 by internal API 225 and passes the accumulated/generated status information 125 to the called function. In turn, the called function copies status information 125 to an appropriate slot or location within internal memory buffer 220.

Native VM monitor 215 acts as a proxy for a variety of external entities (e.g., monitoring console 115) requesting access to internal memory buffer 220 to monitor the internal operation of VM 105. In one embodiment, native VM monitor 215 may receive status requests 130 and serve up status information 125, or portions thereof, in response. Alternatively, or in addition, native VM monitor 215 may negotiate a reporting contract with monitoring console 115 to serve up status information 125 on a regular or periodic basis, without need of status requests 130. As such, native VM monitor 215 may be capable of both pushing status information 125 to monitoring console 115, as well as, monitoring console 115 pulling status information 125 from native VM monitor 215.

Abstracting access to internal memory buffer 220 with internal API 225 insulates and protects the contents of internal memory buffer 220 from the rest of VM 105. Should VM 105 crash, enter an infinite loop, or otherwise fail, status information 220 may still be protected and preserved from corruption. Since native API 230 is executed using native code, native API 230 is not interpreted and executed by VM 105. Accordingly, if VM 105 fails, native VM monitor 215 can still access internal memory buffer 220 to obtain the latest status information 125 updated just prior to VM 105 failing. As such, the contents of internal memory buffer 220 may be retrieved to conduct a postmortem investigate to determine the cause of VM 105's failure.

Figure 3:
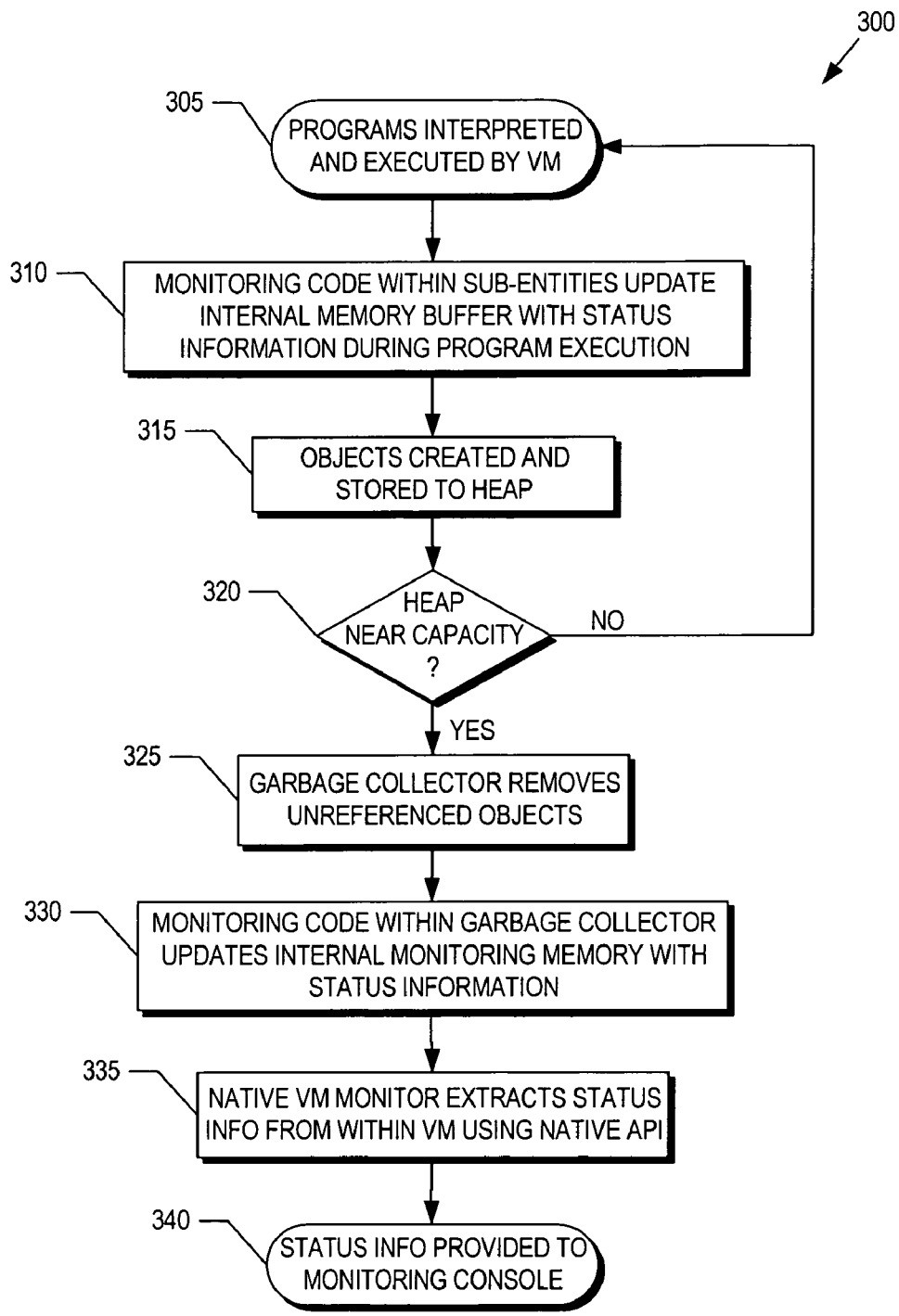
FIG. 3 is a flow chart illustrating a process for monitoring internal operation of a VM, in accordance with an embodiment of the invention.

FIG. 3 is a flow chart illustrating a process 300 for monitoring internal operation of VM 105, in accordance with an embodiment of the invention. In a process block 305, programs 110 are interpreted and executed on VM 105. In a Java embodiment, programs 110 are Java bytecode that is interpreted and converted into native machine code in real-time. The converted machine code is then executed.

During execution of programs 110, the monitoring code updates internal memory buffer 220 with status information 125 pertaining to the operation of a particular program 110, consumption of resources by the particular program 110, and other internal workings of VM 105 (process block 310). The monitoring code may be executed in an interleaving manner with program code of the various sub-entites within VM 105, as discussed above. In one embodiment, the monitoring code accesses internal memory buffer 220 via function calls to internal API 225 and passing the collected/generated status information 125 to the called function.

As programs 110 execute, objects 255 are created and stored to heap 235 (process block 315). As long as heap 235 has available memory to store new objects 255, then programs 110 will continue to execute and create new objects 255 as needed. However, should heap 235 approach capacity and available memory within heap 235 to accept new objects 255 become scarce (decision block 320), then process 300 continues to a process block 325.

In process block 325, garbage collector 240 performs automatic garbage collection to delete unreferenced objects 255 and reclaim the consumed memory within heap 235. In response to the garbage collecting event, monitoring code 265 updates internal memory buffer 220 with status information 125 containing garbage collecting information (process block 330), as described above. In one embodiment, monitoring code 265 accesses internal memory buffer 220 via function calls to internal API 225.

In a process block 335, native VM monitor 215 extracts some or all of status information 125 from internal memory buffer 220 via native API 230. In one embodiment, native VM monitor 215 accesses internal memory buffer 220 via function calls to native API 230. In a process block 340, the retrieved status information 125 is transmitted to monitoring console 115. As discussed above, status information 125 may be pushed to monitoring console 115 or pulled from native VM monitor 215 by sending status requests 130. Monitoring console 115 may execute on the same hardware executing VM 115 or execute on remote hardware communicatively coupled to native VM monitor 215 via a network or other communication medium.

Figure 4:
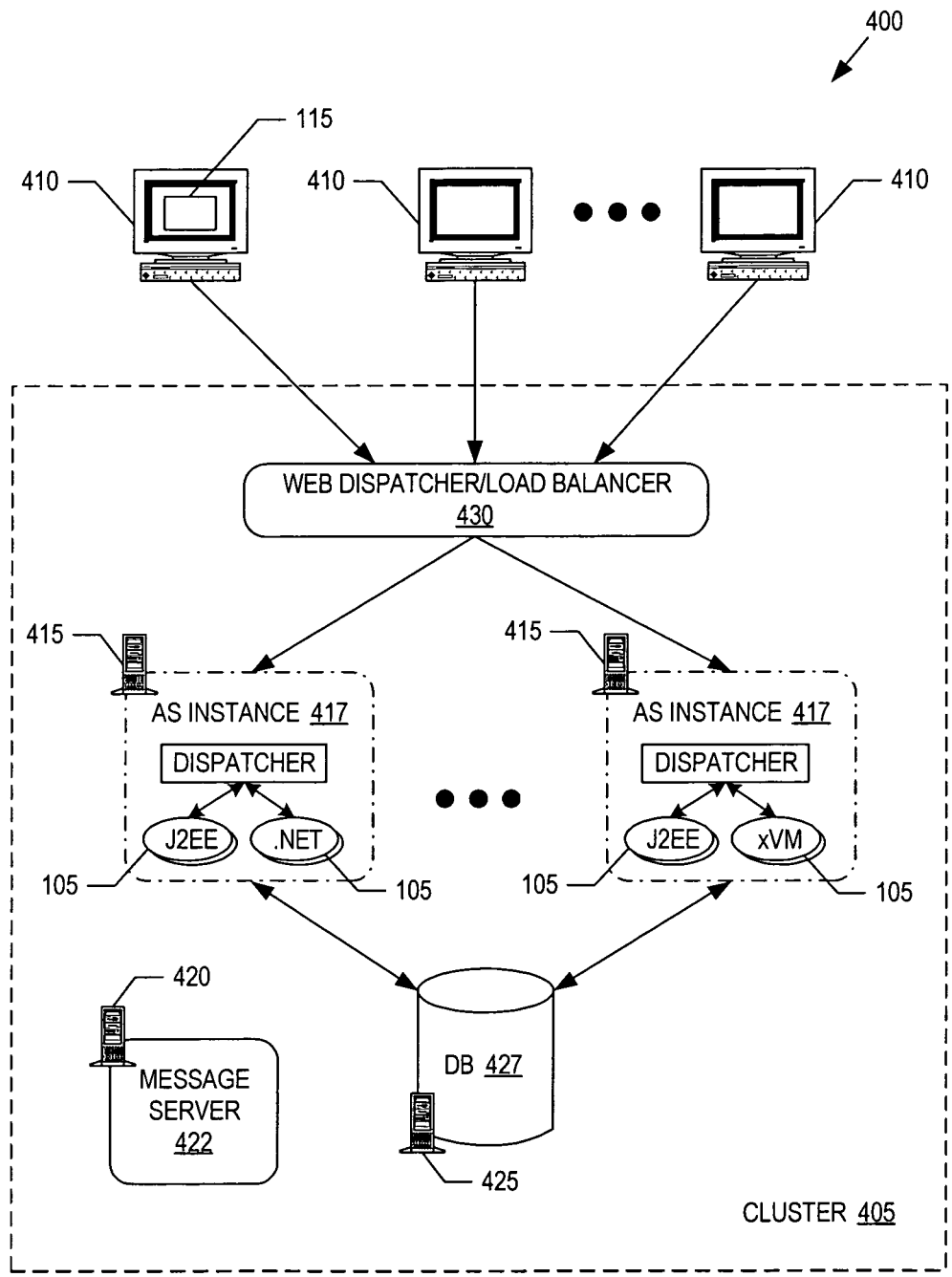
FIG. 4 is a block diagram illustrating a demonstrative enterprise environment for implementing embodiments of the invention.

FIG. 4 is a block diagram illustrating a demonstrative enterprise environment 400 for implementing embodiments of the invention. The illustrated embodiment of enterprise environment 400 includes a cluster 405 coupled to service requests from client nodes 410. Cluster 405 may include one or more server nodes 415 each supporting one or more application server ("AS") instances 417, a message server node 420 supporting a message server 422, a database node 425 supporting a database 427, and a web dispatcher 430.

AS instances 417 may be web application servers, such as Web AS by SAP, .NET by Microsoft, or the like. Each AS instance 417 may include one or more VMs 105 to execute programs 110. Programs 110 executed by VMs 105 within AS instances 417 may collectively provide the logic for implementing various sub-layers (e.g., business layer, integration layer, presentation layer, etc.) of AS instances 417. It should be appreciated that various components of AS instances 417 have been excluded from FIG. 4 for the sake of clarity and so as not to obscure the invention. In one embodiment, VMs 105 may be JVMs compliant with the J2EE standard to execute Java programs. In one embodiment, VMs 105 may be compliant with the .NET framework from Microsoft to execute .NET programs. An AS instance 417 may even include VMs 105 compliant with both the J2EE standard and the .NET framework.

Web dispatcher 430 implements a load-balancing mechanism distributing service requests from client nodes 410 among server nodes 415 within cluster 405. For example, web dispatcher 430 may implement a round-robin load-balancing mechanism or the like. Web dispatcher 430 may be one of server nodes 415 having the task of dispatching service requests among server nodes 415 of cluster 405 or a stand alone hardware node. The service requests are processed by server nodes 415 and subsequently provided to database node 425. Database node 425 offers up the requested data to server nodes 415, which in turn process and format the results for display on client nodes 410. Each AS instance 417 may further include its own dispatcher mechanism to distribute the service requests assigned to it among its individual VMs 105.

In embodiments where VMs 105 are JVMs, programs 110 may be servlets providing server-side logic to generate graphical user interfaces ("GUIs") on clients nodes 410 and may further include JavaServer Page ("JSP") extensions for providing dynamic content within the GUI. Programs 110 may further include business applications providing the business logic of an Enterprise JavaBean ("EJB"), applets providing client side logic, and the like.

One of client nodes 410 may execute monitoring console 115 to provide remote monitoring of AS instances 417, and in particular, remote monitoring of each VM 105. If an IT technician notices that one of the VMs 105 has a low heap utilization, overactive garbage collection activity, or the like, the IT technician can take appropriate action including resetting the problematic VM 105.

Figure 5:
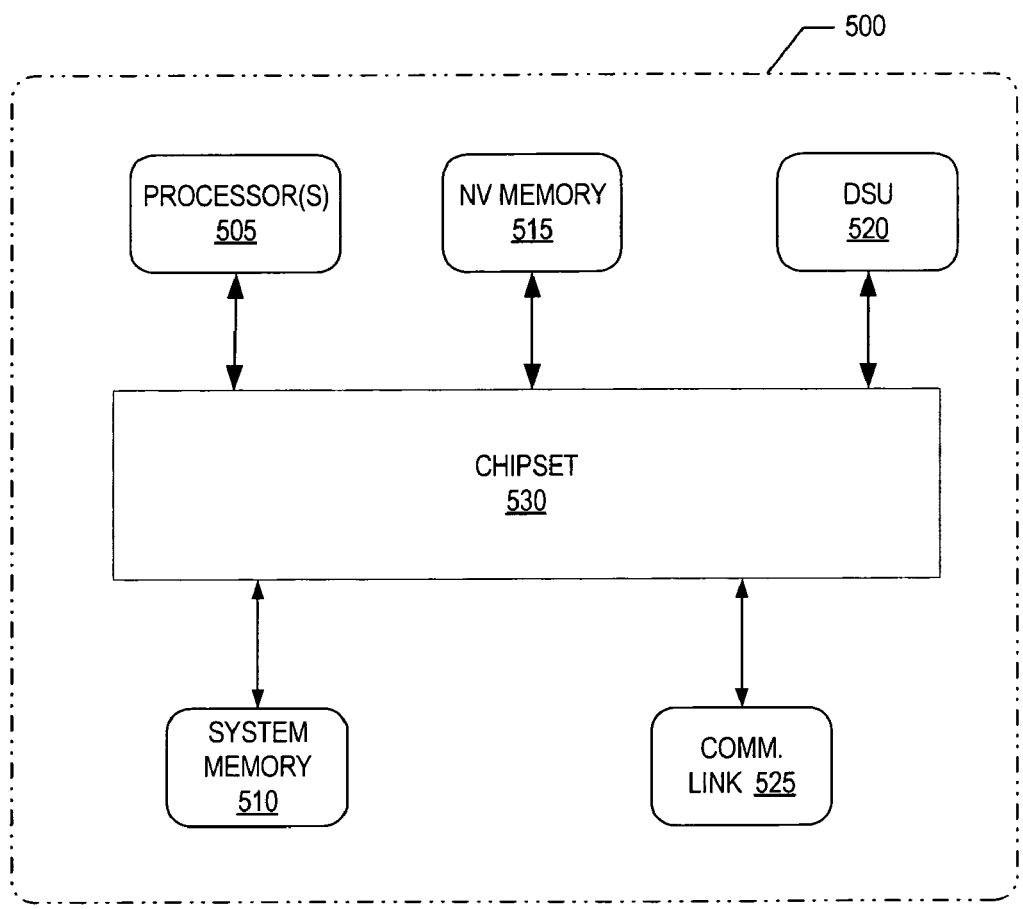
FIG. 5 illustrates a demonstrative processing system for implementing embodiments of the invention.

FIG. 5 is a block diagram illustrating a demonstrative processing system 500 for executing any of VM 105, software environment 200, process 300, or implementing any of client nodes 410, server nodes 415, message server node 420, or database node 425. The illustrated embodiment of processing system 500 includes one or more processors (or central processing units) 505, system memory 510, nonvolatile ("NV") memory 515, a DSU 520, a communication link 525, and a chipset 530. The illustrated processing system 500 may represent any computing system including a desktop computer, a notebook computer, a workstation, a handheld computer, a server, a blade server, or the like.

The elements of processing system 500 are interconnected as follows. Processor(s) 505 is communicatively coupled to system memory 510, NV memory 515, DSU 520, and communication link 525, via chipset 530 to send and to receive instructions or data thereto/therefrom. In one embodiment, NV memory 515 is a flash memory device. In other embodiments, NV memory 515 includes any one of read only memory ("ROM"), programmable ROM, erasable programmable ROM, electrically erasable programmable ROM, or the like. In one embodiment, system memory 710 includes random access memory ("RAM"), such as dynamic RAM ("DRAM"), synchronous DRAM, ("SDRAM"), double data rate SDRAM ("DDR SDRAM") static RAM ("SRAM"), and the like. DSU 520 represents any storage device for software data, applications, and/or operating systems, but will most typically be a nonvolatile storage device. DSU 520 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 520 is illustrated as internal to processing system 500, DSU 520 may be externally coupled to processing system 500. Communication link 525 may couple processing system 500 to a network such that processing system 500 may communicate over the network with one or more other computers. Communication link 525 may include a modem, an Ethernet card, a Gigabit Ethernet card, Universal Serial Bus ("USB") port, a wireless network interface card, a fiber optic interface, or the like.

It should be appreciated that various other elements of processing system 500 have been excluded from FIG. 5 and this discussion for the purposes of clarity. For example, processing system 500 may further include a graphics card, additional DSUs, other persistent data storage devices (e.g., tape drive), and the like. Chipset 530 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 530. Correspondingly, processing system 500 may operate without one or more of the elements illustrated. For example, processing system 500 need not include DSU 520.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Process 300 explained above is described in terms of computer software and hardware. The techniques described may constitute machine-executable instructions embodied within a machine (e.g., computer) readable medium, that when executed by a machine will cause the machine to perform the operations described. Additionally, process 300 may be embodied within hardware, such as an application specific integrated circuit ("ASIC") or the like. The order in which some or all of the process blocks appear in process 300 should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. In some examples above, well-known structures, materials, or operations are not shown or described in detail to avoid obscuring certain aspects. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    operating a virtual machine ("VM") to interpret and to execute a program;
    storing objects created during execution of the program to a heap of the VM;
    with an automatic garbage collector of the VM, garbage collecting objects of the heap which are no longer referenced by the program;
    the VM executing monitoring code of the VM to monitor internal operations of the VM including the garbage collecting, the monitoring the internal operations generating status information including garbage collecting activity information, the executing the monitoring code further to store the status information to an internal memory buffer of the VM during the operating of the VM, wherein storing the status information to the internal memory includes performing a first function call to an internal application programming interface ("API") of the VM for the internal memory buffer; and
    with a VM monitor external to the VM, extracting the status information from the internal memory buffer during the operating of the VM to monitor internal operation of the VM from external to the VM, wherein extracting the status information from the internal memory buffer of the VM comprises:
        accessing the internal buffer via a native API; and
        retrieving the status information to the VM monitor through the native API, wherein the VM does not interpret any native code of the native API for the retrieving the status information.

2. The method of claim 1, wherein the VM comprises a Java virtual machine ("JVM") and the program comprises Java bytecode.

3. The method of claim 2, wherein storing the status information to the internal memory buffer comprises accessing the internal memory buffer via a Java application programming interface ("API").

4. The method of claim 2, wherein the JVM is included within an application server instance and the program comprises an enterprise application to service client requests.

5. The method of claim 1, wherein the garbage collecting activity information includes at least one of a runtime of the garbage collecting, a count of a number of garbage collecting events, a number of the objects collected from the heap, and an amount of memory available within the heap.

6. The method of claim 1, further comprising communicating the status information to a monitoring console for display on the monitoring console.

7. The method of claim 1, further comprising accessing the internal memory buffer in response to a failure of the VM, the accessing to investigate the failure.

8. The method of claim 1, wherein the monitoring code is dedicated to gathering at least a portion of the status information from components of the VM.

9. The method of claim 1, further comprising:
    for each of multiple entities of VM, the entity executing respective monitoring code to perform:
        monitoring respective internal operations of the VM to generate respective status information; and
        storing the respective status information to the internal memory buffer during the operating of the VM.

10. The method of claim 9, wherein the respective status information generated by the multiple entities of VM includes performance statistics for the multiple entities of VM.

11. A computer-readable medium having stored thereon instructions that, if executed by a computer, will cause the computer to perform operations comprising:
    executing a program on a virtual machine ("VM");
    storing to a heap of the VM objects created during the executing of the program;
    garbage collecting one or more of the objects with an automatic garbage collector of the VM, where the one or more of the objects are no longer referenced by the program;
    executing monitoring code of the VM to perform monitor internal operations of the VM including the garbage collecting, the monitoring generating from within the VM status information having garbage collecting activity information;
    storing the status information to an internal memory buffer of the VM during the executing of the program, wherein storing the status information to the internal memory includes performing a first function call to an internal application programming interface ("API") of the VM for the internal memory buffer; and
    with a VM monitor external to the VM, accessing the status information, stored within the internal memory buffer, to monitor internal operation of the VM, wherein accessing the status information from the internal memory buffer of the VM comprises:
        accessing the internal buffer via a native application programming interface ("API"); and
        retrieving the status information to the VM monitor through the native API, wherein the VM does not interpret any native code of the native API for the retrieving the status information.

12. The computer-readable medium of claim 11, wherein the VM comprises a Java virtual machine ("JVM") and the program comprises Java bytecode.

13. The computer-readable medium of claim 12, wherein storing the status information to the internal memory buffer comprises accessing the internal memory buffer via a Java application programming interface ("API").

14. The computer-readable medium of claim 13, wherein the Java API insulates the internal memory buffer from corruption in the event the VM fails.

15. The computer-readable medium of claim 11, wherein storing the status information to the internal memory buffer comprises executing the monitoring code to store the status information to the internal memory buffer.

16. The computer-readable medium of claim 15, further having stored thereon instructions that, if executed by the computer, will cause the computer to perform further operations, comprising:

interleaving execution of the monitoring code with execution of program code of a sub-entity of the VM, wherein the sub-entity includes one of a heap manager and an input/output system.

17. The computer-readable medium of claim 11, wherein the garbage collecting activity information includes at least one of a runtime of the garbage collecting, a count of a number of garbage collecting events, a number of the objects collected from the heap, an amount of memory available within the heap.

18. A system, comprising:
a server node to execute an application server ("AS") instance, the AS instance including logic executed by a processor of the server node to:
execute a program on a virtual machine ("VM");
store to a heap of the VM objects created during the executing of the program;
perform a garbage collecting of one or more of the objects with an automatic garbage collector of the VM, where the one or more of the objects are no longer referenced by the program;
execute monitoring code of the VM to perform monitor internal operations of the VM including the garbage collecting, the monitoring to generate from within the VM status information having garbage collecting activity information;
store the status information to an internal memory buffer of the VM during the executing of the program, wherein storing the status information to the internal memory includes performing a first function call to an internal application programming interface ("API") of the VM for the internal memory buffer; and
access the status information, stored within the internal memory buffer, with a VM monitor external to the VM to monitor internal operation of the VM, wherein accessing the status information from the internal memory buffer of the VM comprises:
accessing the internal buffer via a native application programming interface ("API"); and
retrieving the status information to the VM monitor through the native API, wherein the VM does not interpret any native code of the native API for the retrieving the status information.

19. The system of claim 18, wherein the VM comprises a Java virtual machine complaint with the Java 2 Enterprise Edition standard and the program comprises a Java program.

20. The system of claim 19, further comprising:
a client node to execute a monitoring console, the monitoring console including logic executable by a processor of the client node to:
send a status query to the server node;
receive the status information from the server node in response to the status query; and
display the status information.

* * * * *